United States Patent [19]

Kitano

[11] 4,291,237
[45] Sep. 22, 1981

[54] ANTI-THEFT SYSTEM FOR AUTOMOTIVE VEHICLES

[75] Inventor: Takio Kitano, Nagoya, Japan

[73] Assignee: Nippondenso Co., Ltd., Kariya, Japan

[21] Appl. No.: 44,212

[22] Filed: May 31, 1979

[30] Foreign Application Priority Data

Jun. 2, 1978 [JP] Japan .................................. 53-66996

[51] Int. Cl.³ ............................................ B60R 25/04
[52] U.S. Cl. ............................... 307/10 AT; 180/287; 340/64
[58] Field of Search .................... 307/10 R, 10 AT; 340/63, 64; 364/424; 180/287

[56] References Cited

U.S. PATENT DOCUMENTS

| | | | |
|---|---|---|---|
| 3,784,839 | 1/1974 | Weber | 307/10 AT |
| 3,870,895 | 3/1975 | Lax et al. | 307/10 AT |
| 4,099,495 | 7/1978 | Kiencke et al. | 364/424 |

*Primary Examiner*—L. T. Hix
*Assistant Examiner*—James L. Dwyer
*Attorney, Agent, or Firm*—Cushman, Darby & Cushman

[57] ABSTRACT

In combination with a computerized control apparatus, an anti-theft system includes an input circuit associated with a digital computer to generate a control signal therefrom only when the control apparatus is energized in an authorized manner. The computer is activated in response to receipt of the control signal and deactivated due to lack of the control signal to prevent theft of the vehicle.

4 Claims, 6 Drawing Figures

ANTI-THEFT SYSTEM FOR AUTOMOTIVE VEHICLES

BACKGROUND OF THE INVENTION

The present invention relates to an anti-theft system in combination with an electrical control apparatus adapted for use with a prime mover of an automotive vehicle such as a combustion engine having control means for controlling the combustion of an air-fuel mixture in accordance with changes of a condition of the engine.

In such a conventional electrical engine control apparatus as noted above, a digital computer is adapted to calculate a value corresponding to a setting of the control means by receiving therein an electrical binary signal indicative of a condition of the engine as of a selected instant in time during operation of the engine. The computer is programmed to calculate the value from a function describing a desired relationship between the condition of the engine and the setting of the control means. In practical use of the engine control apparatus, it will be noted that halt of calculation in the computer serves to effectively prevent anyone from starting of the engine, either by providing an electrical jumper across an ignition switch, or by any other known means.

SUMMARY OF THE INVENTION

It is, therefore, a primary object of the present invention to provide an anti-theft system in combination with a computerized control apparatus in which an input circuit is associated with a digital computer to generate a control signal therefrom only when the control apparatus is energized in an authorized manner, and the computer is activated in response to receipt of the control signal and deactivated due to lack of the control signal to prevent theft of the vehicle.

According to the present invention, there is provided an anti-theft system in combination with an electrical control apparatus adapted for use with a prime mover of an automotive vehicle having control means for controlling the operation of the prime mover in accordance with changes of a condition of the prime mover, the apparatus comprising a first electrical circuit for generating an electrical binary signal indicative of a condition of the prime mover as of a selected instant in time during operation of the prime mover, a digital computer for calculating a value corresponding to a setting of the control means by receiving therein the electrical binary signal, the computer being programmed to calculate the value from a function describing a desired relationship between the condition of the prime mover and the setting of the control means, and a second electrical circuit coupled between the digital computer and the control means for converting the value into the setting of the control means. The anti-theft system comprises an electrical input circuit connected to the computer for producing a control signal therefrom only when the electrical control apparatus is energized in an authorized manner, and the computer being further programmed to discriminate whether the input circuit produces the control signal or not and to halt calculation of the value upon discriminating lack of the control signal to make the second electrical circuit inoperative.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
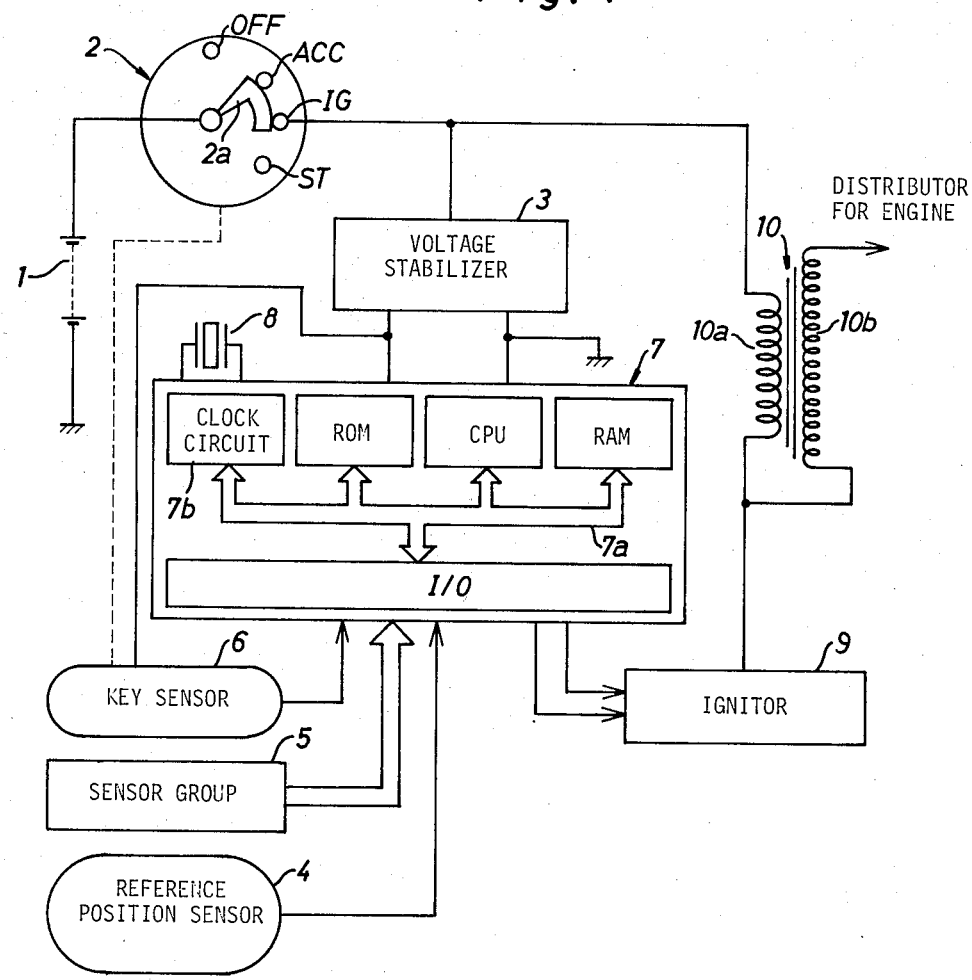
FIG. 1 is a schematic block diagram of an electronic engine control apparatus for theft prevention of a motor vehicle in accordance with the present invention.

Referring now to FIG. 1 of the drawings, there is illustrated a schematic block diagram of an electronic engine control apparatus for theft prevention of a motor vehicle in accordance with the present invention. A vehicle battery 1 of twelve volts has a positive electrode connected to an ignition switch 2 and a negative electrode grounded. The ignition switch 2 is provided therein with a movable contact 2a cooperable with a cylinder lock (not shown), and OFF, ACC, IG and ST fixed contacts for selective connection with the movable contact 2a. The movable contact 2a is connected to the positive electrode of battery 1, and the ACC contact is connected to various electric equipments (not shown) such as a radio, a stereo and the like. The IG contact is connected to an ignition coil 10, and the ST contact is connected to a starter motor (not shown) for an internal combustion engine of the vehicle. While an ignition key 2f (see FIG. 2) is removed from the cylinder lock, the movable contact 2a is connected only with the OFF contact. When the key 2f is engaged with and rotated in the cylinder lock by an operator, the movable contact 2a is rotated to connect with the ACC and IG contacts in sequence. When the key 2f is further rotated against resilient means within the cylinder lock, the movable contact 2a is temporarily connected to the ST contact. When the key 2f is released by the operator, it is returned by the resilient means such that the movable contact 2a is disconnected from the ST contact and connected to the ACC and IG contacts. The ignition coil 10 has a primary winding 10a connected to the IG contact of ignition switch 2 and a secondary winding 10b connected to a distributor for the engine.

The electronic engine control apparatus comprises a reference position sensor 4, and a sensor group 5 including a rotational speed sensor, a negative pressure sensor, a coolant temperature sensor and the like. The reference position sensor 4 serves to detect a predetermined angular position of a crankshaft of the engine before the arrival of a piston to its top dead center position so as to produce a reference pulse signal therefrom per one crankshaft rotation. The reference pulse signal from sensor 4 is applied to a digital computer 7 as a trigger signal for initiating execution in the computer 7. In the sensor group 5, the rotational speed sensor detects rotational speed of the crankshaft to produce an electric binary signal indicative of the rotational speed of the crankshaft. The negative pressure sensor detects negative pressure in an induction passage of the engine to produce an electric binary signal indicative of the negative pressure. The coolant temperature sensor detects coolant temperature of the engine to produce an electric binary signal indicative of the coolant temperature. The binary signals from sensor group 5 are respectively applied to the computer 7.

The electronic engine control apparatus further comprises a key sensor 6 which is provided within the cylinder lock of ignition switch 2. The key sensor 6 receives a constant voltage of 5 volts from a voltage stabilizer 3 to produce an electric key signal when the ignition key 2f is engaged with and rotated in the cylinder lock to connect the movable contact 2a with the IG contact. The electric key signal from key sensor 6 is applied to the computer 7. Even when an electrical jumper is connected across the ignition switch 2 during removal of the key 2f from the cylinder lock, any electric key signal may not be produced from key sensor 6. The stabilizer 3 receives an electric voltage from battery 1 under connection between the movable contact 2a and the IG contact to produce the constant voltage.

The digital computer 7 is a single chip LSI microcomputer and comprises a central processing unit of CPU which is connected to an input-output device or I/O through a data bus 7a. CPU is also connected through data bus 7a to a clock circuit 7b, a read only memory or ROM, and a random access memory or RAM. I/O receives the key signal from key sensor 6 and the binary signals from sensor group 5 to temporarily memorize them in RAM. The memorized signals in RAM are selectively read out and applied by I/O to CPU through data bus 7a. A program is previously stored in ROM such that after discriminating the fact that the key signal has been produced from key sensor 6, CPU calculates values corresponding with initiation and termination of energizing the ignition coil 10 from a function describing a desired relationship between condition of the engine and energization of the ignition coil 10. The program is also stored in ROM such that CPU halts operation of computer 7 when discriminated the fact that any key signal is not produced from key sensor 6. The above-noted function is experimentally obtained in a conventional way and is previously memorized in ROM.

The clock circuit 7b is cooperable with a crystal oscillator 8 to produce clock signals at a predetermined frequency of about $10^6$ Hz. The computer 7 receives the constant voltage from stabilizer 3 to be conditioned in its operation. CPU initiates execution in computer 7 in response to the reference pulse signal from sensor 4 and reads out the key signal from RAM to discriminate the fact that the key signal has been produced from key sensor 6. Subsequently, CPU calculates values in accordance with the binary signals from RAM by means of the program. Then, CPU produces first and second output signals respectively corresponding with the calculated values and sequentially applies them to ignitor 9 through I/O. When any key signal is not memorized in RAM, CPU discriminates the fact that any key signal is not produced from key sensor 6 and halts operation of computer 7. In practice of the present invention, a microcomputer of 8048 type manufactured by INTEL CORP. has been used as the computer 7 due to its commercial availability. Detail description regarding the microcomputer is eliminated because the particular construction and programming process is well known in the prior art.

The ignitor 9 includes a flip-flop for receiving the first and second output signals from computer 7. The flip-flop is set in response to the first output signal from computer 7 to produce therefrom an electric signal indicative of energizing timing of ignition coil 10. When the flip-flop is reset in response to the second output signal from computer 7, it produces therefrom an electric signal indicative of deenergizing timing of ignition coil 10. The electric signals from the flip-flop are respectively amplified by an amplifier and applied to a power transistor. The power transistor is turned on in response to the amplified electric signal indicative of the energizing timing to energize the primary winding 10a of ignition coil 10. When the power transistor is turned off in response to the amplified electric signal indicative of the deenergizing timing, it deenergizes the primary winding 10a to produce an electric spark voltage in the secondary winding 10b of ignition coil 10. The spark voltage from ignition coil 10 is applied by the distributor to spark plugs for the engine to respectively activate the spark plugs.

Figure 2:
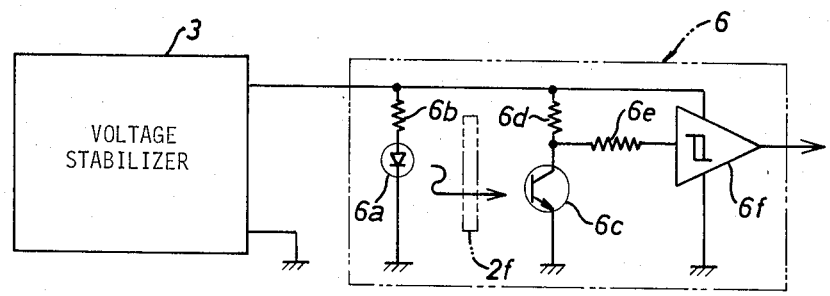
FIG. 2 is a schematic diagram of the key sensor shown in block form in FIG. 1.

FIG. 2 illustrates an embodiment of the key sensor 6 which includes a light emitting diode 6a and a photo transistor 6c located opposite to each other at outside of a longitudinal keyhole formed in the cylinder lock. The diode 6a has an anode connected to a resistor 6b and a cathode grounded. The transistor 6c has a collector connected to a resistor 6d and an emitter grounded. The resistors 6b, 6d are connected to the voltage stabilizer 3. When the ignition key 2f is inserted into and rotated in the keyhole to connect the movable contact 2a with the IG contact, the diode 6a emits an amount of light upon receiving the constant voltage from stabilizer 3, and the transistor 6c is prevented by the key 2f from receiving an amount of the light from diode 6a such that it is turned off to produce a high level signal therefrom. Even if an electrical jumper is connected across the ignition switch 2 without the key 2f, the transistor 6c will receive an amount of the light from diode 6a such that any high level signal may not be produced from the transistor 6c. A schmitt circuit 6f is provided to receive the high level signal from transistor 6c through a resistor 6e. The high level signal is reshaped by the schmitt circuit 6f into a rectangular pulse signal and applied to computer 7 as the key signal.

Figure 3:
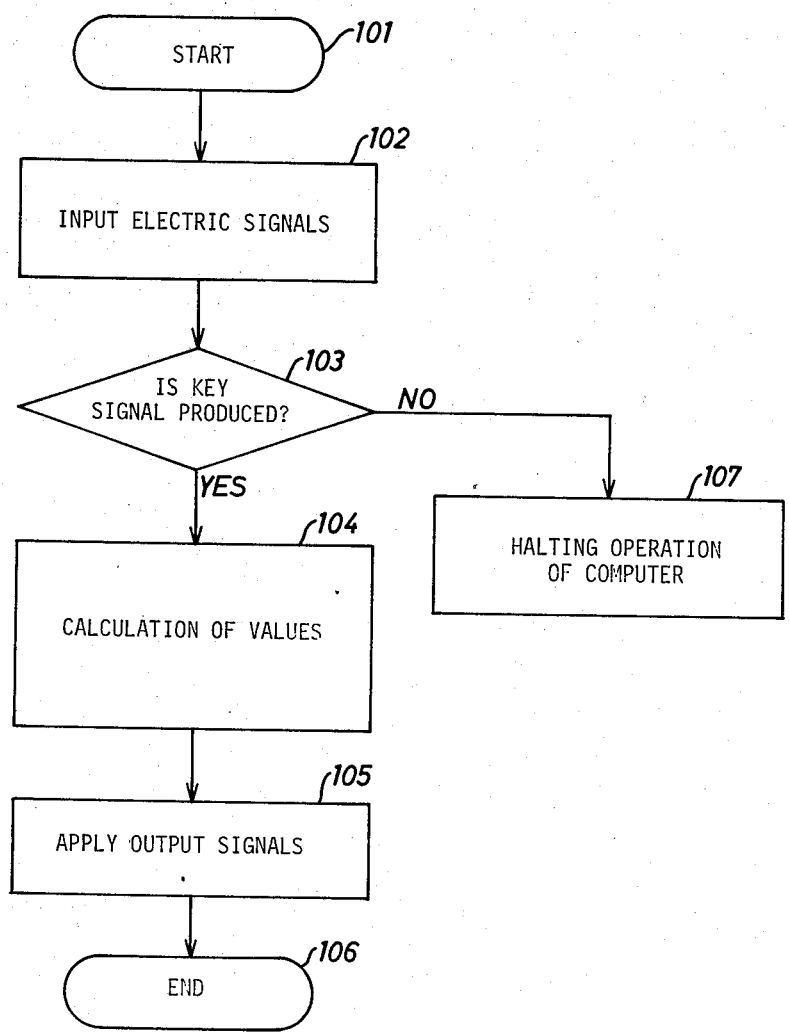
FIG. 3 is a flow diagram illustrative of the programming of the digital computer used to control operation of the ignition coil.

Hereinafter, various operational modes of the electronic engine control apparatus will be described in detail with reference to a flow diagram of the computer program shown in FIG. 3. During removal of the ignition key 2f from the cylinder lock, the movable contact 2a of ignition switch 2 is connected to the OFF contact to block supply of the electric voltage from battery 1 to the electric equipments, the ignition coil 10, the voltage stabilizer 3 and the starter motor. In case the key 2f is inserted into and rotated in the keyhole of the cylinder lock to connect the movable contact 2a with the ACC contact of ignition switch 2, the electric voltage from battery 1 is applied to the electric equipments. When the key 2f is further rotated to connect the movable contact 2a with the IG contact of ignition switch 2, the electric voltage from battery 1 is applied to the voltage stabilizer 3 and ignition coil 10. Then, the computer 7 receives the constant voltage from stabilizer 3 and is conditioned in its operation, and the key sensor 6 also receives the constant voltage from stabilizer 3 to produce an electric key signal therefrom, as previously described. Thus, the electric key signal from key sensor 6 is applied to computer 7.

When the key 2f is further rotated to temporarily connect the movable contact 2a with the ST contact of ignition switch 2, the electric voltage from battery 1 is temporarily applied to the starter motor to crank the engine. Then, a reference pulse signal is produced from sensor 4, as previously described and applied to computer 7. Thus, execution in computer 7 is initiated at a point 101 according to the program and proceeds to a point 102. In the sensor group 5, the speed sensor also produces an electric binary signal indicative of the rotational speed, the negative pressure sensor produces an electric binary signal indicative of the negative pressure, and the coolant temperature sensor produces an electric binary signal indicative of the coolant temperature, as previously described. These binary signals are respectively applied to computer 7 together with the key signal from key sensor 6. Then, the binary signals and key signal are applied to and temporarily memorized in RAM.

When the computer program proceeds to a point 103, CPU discriminates as "yes" by using the key signal read out from RAM, thereafter the program proceeding to the following step 104. At this point 104, CPU sequentially calculates values according to initiation and termination of energizing the ignition coil 10 by using the binary signals from RAM and the data from ROM. Then, CPU produces first and second output signals corresponding to calculated values, the program proceeding to points 105, 106 in sequence. When the first and second output signals from CPU are applied to the ignitor 9, the ignitor 9 energizes the primary winding 10a of ignition coil 10 in response to the first output signal from computer 7 and deenergizes the primary winding 10a in response to the second output signal from computer 7. Thus, an electric spark voltage is produced from the secondary winding 10b of ignition coil 10 and applied by the distributor to the spark plugs. As a result, the spark plugs are respectively activated to conduct start of the engine. In addition, the above-noted execution in computer 7 is repeated in response to each reference pulse signal issued from sensor 4 to maintain operation of the engine.

In case an electrical jumper is connected across the ignition switch 2 without the key 2f, the electric voltage from battery 1 is applied to the voltage stabilizer 3, the ignition coil 10 and the starter motor. Then, the engine is cranked by the starter motor, and the computer 7 is conditioned in its operation upon receiving the constant voltage from stabilizer 3. However, at this stage, the key sensor 6 does not produce any electric key signal therefrom, as previously described. When the sensor 4 produces a reference pulse signal in response to cranking of the engine, execution in computer 7 is initiated at point 101 according to the program and proceeds to point 102, as previously described. The sensor group 5 also produces electric binary signals and applies the same to computer 7. Then, the binary signals are applied to and temporarily memorized in RAM at point 102, the computer program proceeding to point 103.

When CPU discriminates as "no" because any key signal is not memorized in RAM, it serves to halt operation of computer 7 according to the program at the following point 107 and does not produce any output signal therefrom. Thus, the ignitor 9 is maintained inoperative so that the ignition coil 10 does not produce an electric spark voltage. As a result, each of the spark plugs is not activated, and the engine may not be started. From the above description, it will be understood that even if such an attempt is made to start the vehicle without usage of the ignition key 2f, the electronic engine control apparatus disables start of the engine, thereby to ensure theft prevention of the vehicle. Furthermore, the electronic engine control apparatus may be simple in its construction and foolproof in its operation due to effective utilization of the computer 7.

Figure 4:
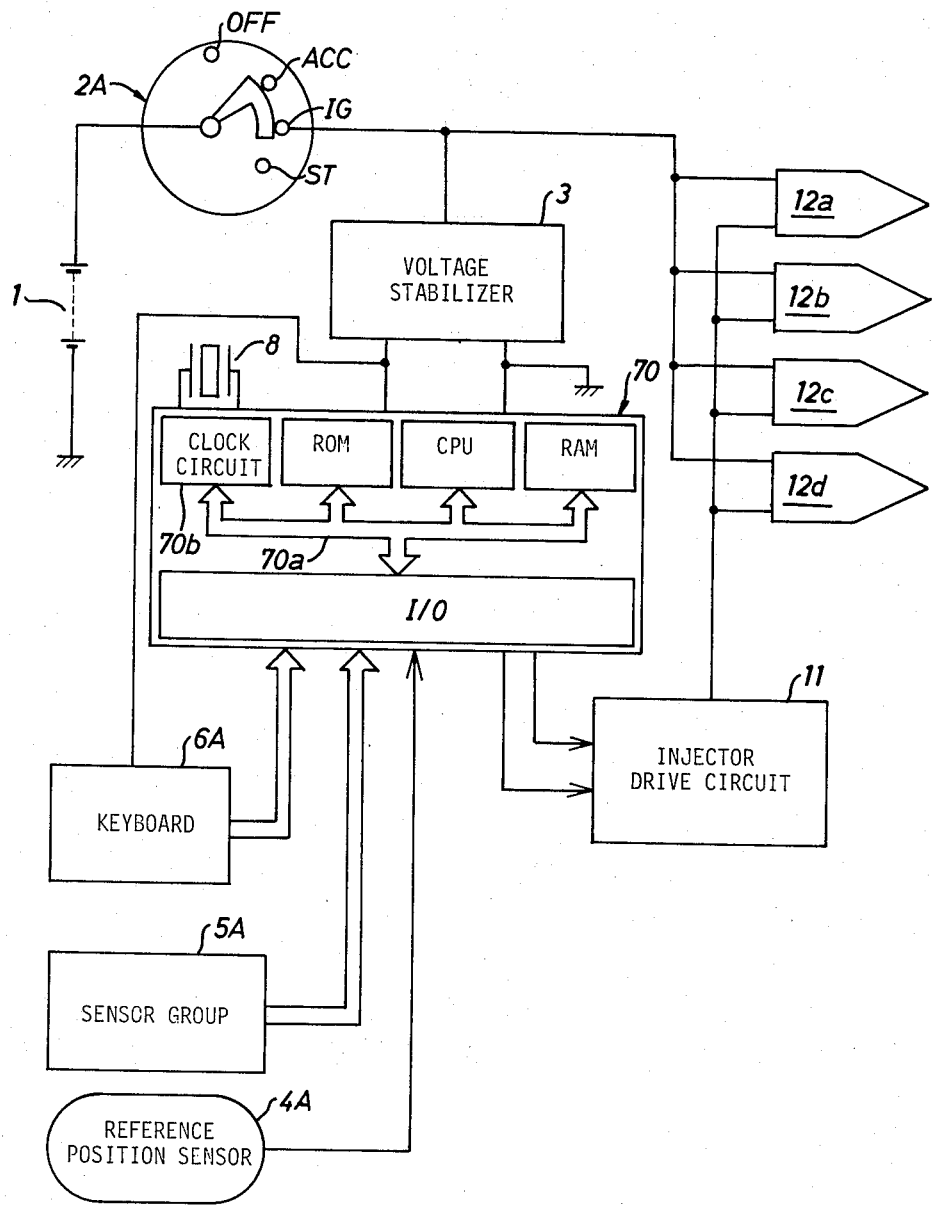
FIG. 4 is a schematic block diagram of another preferred embodiment in accordance with the present invention.

FIG. 4 illustrates another preferred embodiment of the present invention which includes an ignition switch 2A and fuel injectors 12a to 12d for the engine. The ignition switch 2A has a movable contact connected to the positive electrode of battery 1 and OFF, ACC, IG and ST contacts for selective connection with the movable contact. The ACC contact is connected to electric equipments as similar in the previous embodiment, the IG contact is connected to a first input terminal of each fuel injector, and the ST contact is connected to a starter motor as similar in the previous embodiment.

This embodiment comprises a reference position sensor 4A and a sensor group 5A. The reference position sensor 4A serves to detect an angular reference position of an engine crankshaft to produce a reference pulse signal per one crankshaft rotation. The reference pulse signal from sensor 4A is applied to a digital computer 70 as a trigger signal for initiating execution in computer 70. The sensor group 5A includes the rotational speed sensor, negative pressure sensor and coolant temperature sensor of the previous embodiment. The sensor group 5A also includes an air temperature sensor and an exhaust gas sensor. The air temperature sensor detects temperature of air flowing through the induction passage to produce an electric binary signal indicative of the air temperature. The exhaust gas sensor detects component of exhaust gases flowing through an exhaust passage of the engine to produce an electric binary signal indicative of component of the exhaust gases. The binary signals from sensor group 5A are respectively applied to the computer 70.

A keyboard 6A is provided thereon with a plurality of figure-indicated keys to be selectively actuated. The keyboard 6A is located near the ignition switch 2A and receives the constant voltage from the voltage stabilizer 3 of the previous embodiment to be conditioned in its operation. When each of the figure-indicated keys is actuated, the keyboard 6A produces an electric code signal indicative of a digit defined by the actuated key. Each of the code signals from keyboard 6A is applied to the computer 70.

The digital computer 70 comprises a central processing unit or CPU which is connected to an input-output device or I/O through a data bus 70a. CPU is also connected through data bus 70a to a clock circuit 70b, a read only memory or ROM, and a random access memory or RAM. I/O sequentially receives a plurality of the code signals from keyboard 6A to temporarily memorize them in RAM as a number. I/O also receives the binary signals from sensor group 5A to temporarily memorize them in RAM. The memorized signals in RAM are selectively read out and applied by I/O to CPU through data bus 70a. A program is previously stored in ROM such that after discriminating the fact that the number defined by the memorized code signals in RAM accords with a predetermined four-digit number, CPU calculates values respectively corresponding with operating duration of each pair of fuel enjectors 12a, 12c and 12b, 12d from a function describing a desired relationship between condition of the engine and operation of each fuel injector. The predetermined four-digit number is previously memorized in ROM, and the above-noted function is experimentally obtained in a conventional way and is previously memorized in ROM. The program is also stored in ROM such that CPU halts operation of computer 70 when discriminated the fact that the number defined by the memorized code signals in RAM discords with the predetermined four-digit number.

The clock circuit 70b is cooperable with the crystal oscillator 8 of the previous embodiment. The computer 70 receives the constant voltage from stabilizer 3 to be conditioned in its operation. When received the code signals from keyboard 6A as an interruption request signal, CPU performs execution in computer 70 as to whether or not the number defined by the code signals in RAM accords with the predetermined four-digit number. CPU initiates another execution in computer 70 in response to the reference pulse signal from sensor 4A and discriminates the fact that the number defined by the code signals from RAM accords with the predetermined four-digit number from ROM. Subsequently, CPU calculates values in accordance with the binary signals from RAM by means of the program. Then, CPU produces first and second output signals corresponding with the calculated values and sequentially applies them to an injector drive circuit 11 by I/O. When discriminated the fact that the number defined by the code signals from RAM discords with the predetermined four-digit number, CPU serves to halt operation of the computer 7. When any code signal from keyboard 6A is not memorized in RAM, CPU discriminates as discord in relation to the predetermined four-digit number. Other construction and function of computer 70 are substantially the same as those of computer 7 of the previous embodiment. The injector drive circuit 11 is connected to a second input terminal of each fuel injector and sequentially activates each pair of the fuel injectors 12a, 12c and 12b, 12d in response to the first and second output signals from the computer 70 to conduct start of the engine.

Figure 5:
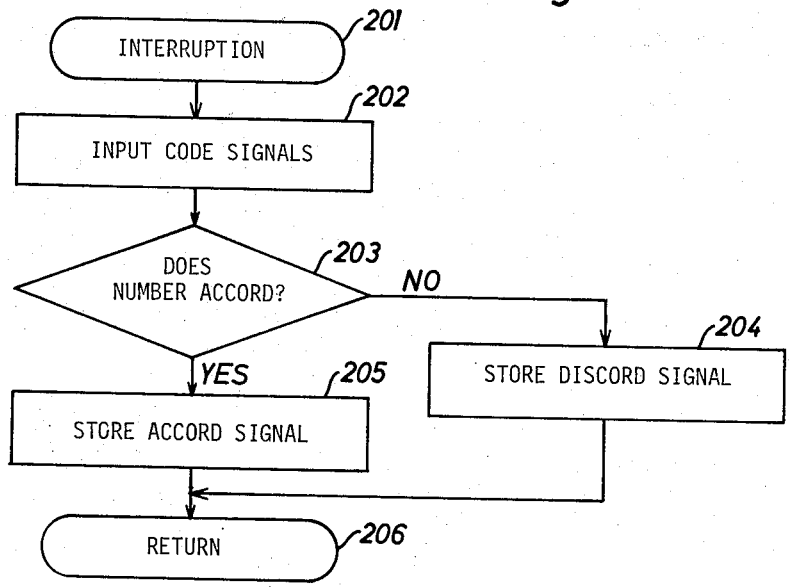
FIGS. 5, 6 are flow diagrams respectively illustrative of the programming of the digital computer used to control operation of each fuel injector.
Figure 6:
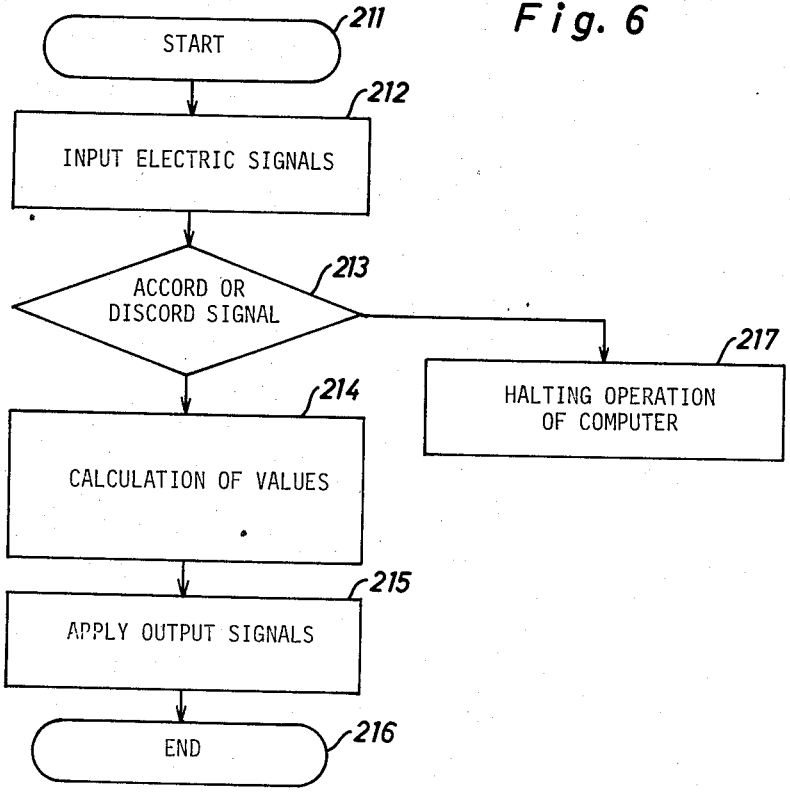

Hereinafter, various operational modes of the embodiment will be described in detail with reference to flow diagrams of the computer program shown in FIGS. 5, 6. When the ignition switch 2A is actuated to connect the movable contact with the IG contact, the electric voltage from battery 1 is applied to the voltage stabilizer 3 and each fuel injector. Then, the computer 70 and keyboard 6A respectively receive the constant voltage from stabilizer 3 and are conditioned in their operations. When four selected keys of the keyboard 6A are actuated to produce four electric code signals respectively indicative of the digits defined by the predetermined four-digit number, the four code signals are applied to the computer 70 as an interruption request signal. The, execution in computer 70 is performed by CPU at an interruption point 201 (see FIG. 5), and the four code signals are temporarily memorized in RAM as a four-digit number at a point 202. When the computer program proceeds to the following point 203, CPU discriminates as "yes" because the four-digit number from RAM accords with the predetermined four-digit number from ROM. Then, the program proceeds to a point 205, and the discriminated result in CPU is temporarily memorized in RAM as an accord signal.

When at this stage the ignition switch 2A is further actuated to temporarily connect the movable contact with the ST contact, the electric voltage from battery 1 is applied to the starter motor to crank the engine. Then, a reference pulse signal is produced from sensor 4A in response to cranking of the engine, as previously described and is applied to computer 70. When another execution is initiated at a point 211 (See FIG. 6) in response to the reference pulse signal, electric binary signals from the sensor group 5A are applied to and temporarily memorized in RAM at a point 212, the program proceeding to the following point 213. Then, CPU reads out the accord signal from RAM and discriminates the fact that keyboard 6A has been correctly actuated, the program proceeding to a point 214. At this point 214, CPU calculates values respectively corresponding with operating duration of each pair of the fuel injectors 12a, 12c and 12b, 12d by using the binary signals from RAM and the data from ROM. Then, CPU sequentially produces first and second output signals corresponding to the calculated values, the program proceeding to points 215, 216 in sequence. When the first and second output signals from CPU are applied to the injector drive circuit 11 by I/O, the injector drive circuit 11 activates each pair of the fuel injectors 12a, 12c and 12b, 12d in response to the first and second output signals from computer 70 to conduct start of the engine.

If the ignition switch 2A is actuated to connect the movable contact with the ST contact without actuation of keyboard 6A in the above-noted operation mode, the computer execution is initiated at point 211 in response to the reference pulse signal from sensor 4A. Then, the binary signals from sensor group 5A are applied to and temporarily memorized in RAM at point 212. When the computer program proceeds to point 213, CPU discriminates the fact that the keyboard 6A has not been correctly actuated. Then, CPU halts operation of computer 70 at the following point 217 and does not produce any output signal. Thus, the injector drive circuit 11 is maintained inoperative so that each fuel injector is deactivated to disable start of the engine.

If the keyboard 6A is erroneously actuated in the above-noted operation mode, it sequentially produces electric code signals respectively indicative of digits different from the digits defined by the predetermined four-digit number. Then, the code signals are applied to computer 70 to perform execution in computer 70 at the interruption point 201 and temporarily memorized in RAM at point 202 as an erroneous number. When the computer program proceeds to point 203, CPU discriminates as "no" because the erroneous number from RAM discords with the predetermined four-digit number from ROM. Then, the program proceeds to a point 204, and the discriminated result in CPU is temporarily memorized in RAM as a discord signal.

When at this stage the ignition switch 2A is further actuated to connect the movable contact with the ST contact, the electric voltage from battery 1 is applied to the starter motor to crank the engine. Then, another execution in computer 70 is initiated at point 211 in response to the reference pulse signal from sensor 4A, as previously described, and the binary signals from sensor group 5A are applied to and temporarily memorized in RAM at point 212. When CPU reads out the discord signal from RAM, it discriminates the fact that the keyboard 6A has been erroneously actuated, the program proceeding to point 217. Then, CPU halts operation of computer 70 and does not produce any output signal. Thus, the injector drive circuit 11 is maintained inoperative so that each fuel injector is deactivated to disable start of the engine.

From the above description, it will be understood that even if such an attempt is made to start the vehicle without correct actuation of keyboard 6A, the electronic engine control apparatus disables start of the engine, thereby to ensure theft prevention of the vehicle.

In case an electrical jumper is connected across the ignition switch 2A, the electric voltage from battery 1 is applied to the voltage stabilizer 3, the fuel injectors 12a to 21d and the starter motor. Then, the engine is cranked by the starter motor, and the computer 70 and keyboard 6A are conditioned in their operations in response to the constant voltage from stabilizer 3. When the sensor 4A produces a reference pulse signal in response to cranking of the engine, another execution in computer 70 is initiated at point 211 and proceeds to point 212. Then, electric binary signals are produced from sensor group 5A, as previously described, and are applied to and temporarily memorized in RAM.

When the computer program proceeds to point 213, CPU discriminates the fact that the keyboard 6A has not been actuated correctly. Then, CPU halts operation of computer 70 at point 217 and does not produce any output signal. Thus, the injector drive circuit 11 is maintained inoperative so that each fuel injector is deactivated to disable start of the engine. From the above description, it will be understood that even if such an attempt is made to start the vehicle without usage of keyboard 6A, the electronic engine control apparatus disables start of the engine, thereby to ensure theft prevention of the vehicle.

Although in the above embodiments the computers 7, 70 are respectively programmed to halt their operations at points 107, 217 so as to produce no output signal, each of the computer programs may be modified such that each computer repetitively conducts execution thereof in response to each reference pulse signal from each reference position sensor to produce no output signal therefrom.

While in the above embodiments the present invention is adapted to the engine of the vehicle, it may be modified to be adapted to an electric motor for an electromobile such that the electric motor may not be started by various known manners for theft of the electromobile.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In combination with an electrical control apparatus adapted for controlling the prime mover of an automotive vehicle, said electrical control apparatus having control means for controlling the operation of said prime mover in accordance with changes of a condition of said prime mover, switch means for selectively connecting or disconnecting said apparatus to and from a source of electricity, a first electrical circuit for generating an electrical binary signal indicative of a condition of said prime mover at a selected instant in time during the operation of said prime mover, a digital computer for calculating a value corresponding to a setting of said control means by receiving therein said electrical binary signal, said computer being programmed to calculate said value from a function describing a desired relationship between the condition of said prime mover and the setting of said control means, and a second electrical circuit coupled between said digital computer and said control means for converting said value into the setting of said control means, an anti-theft system comprising:
    an electrical control circuit associated with said switch means for generating a control signal therefrom only when said switch means is operated in an authorized manner to connect said apparatus to said source of electricity, and said computer is arranged to be activated even when said apparatus is connected to said source of electricity in an unauthorized manner, and wherein said computer is further programmed to discriminate whether the control signal is produced or not and to halt calculation of said value upon discriminating lack of the control signal to make said second electrical circuit inoperative.

2. An anti-theft system as claimed in claim 1, wherein said switch means is an ignition switch associated with a cylinder lock to connect said apparatus to a source of electricity when said cylinder lock is operated by an ignition key, and said electrical circuit includes an electrical sensor for detecting actuation of said ignition switch to produce a control signal therefrom only when said cylinder lock is operated by said ignition key.

3. An anti-theft system as claimed in claim 2, wherein said electrical sensor comprises a light emission semiconductor and a photo semiconductor connected with said source of electricity through said ignition switch, both of said semiconductors being opposed to each other to permit insertion of said ignition key therebetween, said photo semiconductor producing at its output said control signal only when said ignition key interferes light from said light emission semiconductor to said photo semiconductor.

4. An anti-theft system as claimed in claim 1, wherein said electrical control circuit includes a keyboard provided thereon with a plurality of figure-indicated keys to produce said control signal only when said keys are actuated to define a predetermined number.

* * * * *